United States Patent [19]
Hildebrandt et al.

[11] Patent Number: 5,275,577
[45] Date of Patent: Jan. 4, 1994

[54] PULLEY RETENTION MECHANISM

[75] Inventors: Eugene F. Hildebrandt, St. Louis, Mo.; Philip S. Johnson, Granite City, Ill.; Barry M. Newberg, Florissant, Mo.

[73] Assignee: Emerson Electric Co., St. Louis, Mo.

[21] Appl. No.: 927,017

[22] Filed: Aug. 10, 1992

[51] Int. Cl.$^5$ .............................................. F16H 55/30
[52] U.S. Cl. .................................................... 474/903
[58] Field of Search ................ 474/166, 152, 902, 903

[56] References Cited

U.S. PATENT DOCUMENTS

| | | | |
|---|---|---|---|
| 1,909,500 | 5/1933 | Ornitz | 474/903 X |
| 4,509,381 | 4/1985 | Ikemoto et al. | 474/903 X |
| 4,998,905 | 3/1991 | Martin | 474/903 X |

Primary Examiner—Thuy M. Bui
Attorney, Agent, or Firm—Polster, Lieder, Woodruff & Lucchesi

[57] ABSTRACT

An improved mechanism for retaining a pulley on a motor shaft is disclosed wherein the shaft has a circumferential groove formed near its end and the pulley has a hub to engage the shaft with a plurality of flexible fingers formed around and extending outward from the hub. The fingers have a pawl disposed to drop into the circumferential groove on the shaft and thereby secure the pulley in place. The pawls can be of various configurations so as to both align properly with the groove and to accommodate tolerance in the shaft assembly. The shaft also has splines formed thereon proximate to the groove that matingly engage corresponding keyways formed inside the pulley hub so that the shaft positively mates with the pulley.

19 Claims, 3 Drawing Sheets

PULLEY RETENTION MECHANISM

BACKGROUND OF THE INVENTION

This invention relates to a pulley and shaft mechanism, more specifically, to a low-cost pulley construction incorporating a suitable mechanism for retaining and positioning the pulley on a motor shaft.

Electric motor shafts with pulleys attached thereto are well known in the art. For example, in home appliances, such as a washing machine, an electric motor is used to drive the agitator mechanism. To that end, the electric motor is designed having a shaft with a pulley secured to the exposed end of the shaft. The pulley engages a drive belt means for translating the rotation of the motor shaft to the agitator assembly.

Generally, pulley assemblies known to the art are complicated in construction and relatively expensive to manufacture because of that construction. For example, prior art pulleys with which I am familiar are stamped metal constructions. The pulley is formed from two metal stampings, which are then joined together mechanically in any desired way. Welding the parts often was the preferred assembly method. After assembling the pulley, it is mounted in its intended application. The motor shaft end that engages the pulley conventionally is threaded and the pulley is mounted on the shaft and retained on the shaft by a suitably threaded nut and washer assembly. The mounting portion of the shaft, including the threads, is generally at least partially of a lesser diameter than the body of the shaft. A washer or other retaining ring is placed over the threaded portion so as to seat against the shoulder formed where the threaded diameter meets the greater shaft diameter. The pulley seats against the washer or retaining ring to prevent retrograde moving of the pulley. Usually, another lock washer or retaining ring is slipped over the threaded diameter of the shaft and the nut is tightened thereon, securing the pulley in place. The threaded portion of the motor shaft is often formed in a special shape, that shape also being formed as an opening in the hub of the pulley, so that the shaft engages the pulley. This type of pulley and shaft assembly requires multiple parts: a washer or retaining ring, the pulley, which as indicated, commonly is assembled from two metal halves, another retaining ring or washer, and the threaded nut.

If there are variations in the shaft assembly tolerance motor to motor, washers or retaining rings of variable thicknesses or additional retaining rings that serve as spacers must be added to position the pulley appropriately on the shaft. The use of additional spacers or washers add to the number of parts required to mount the pulley properly and add to the cost of construction.

SUMMARY OF THE INVENTION

It is therefore an object of the present invention to provide a pulley retention mechanism that is defined merely by the pulley and the shaft, requiring no other parts.

Another object of the invention is to provide a pulley positioning mechanism that includes the use of fingers extending outwardly from the perimeter of the pulley hub, the fingers disposed to lock into a circumferential groove formed in the motor shaft.

Still another object of the invention is to provide a pulley retention mechanism that can accommodate variable tolerances in the motor and shaft assembly.

Yet another object of the invention is to provide a pulley retention mechanism in which the pulley has been formed from a non-metallic material such as a high impact plastic.

Another object of the invention is to provide a pulley retention mechanism that includes the use of splines formed on the shaft that matingly engage grooves formed within the pulley hub so the shaft engages the pulley and does not rotate therein.

In accordance with this invention, generally states a low cost pulley assembly is provided for mounting on a corresponding shaft. The shaft has a circumferential groove formed in it, and the pulley has flexible fingers extending outward from the perimeter of the hub of the pulley. The fingers have pawls located on the ends. The pawls automatically drop into the groove formed in the shaft when the pulley is assembled on the shaft. The circumferential groove on the shaft has sharp edges thereon so as to mate properly with the pawls to hold the pulley in place. In other embodiments of the invention, the pawls on the end of the fingers of the pulley are formed with a stair-step or saw tooth silhouette so as to accommodate tolerances in the application of the assembly. The shaft also has splines formed thereon, which engage corresponding hinges formed within the hub so that the pulley positively mates with the motor shaft.

DESCRIPTION OF THE PREFERRED EMBODIMENT

Figure 1:
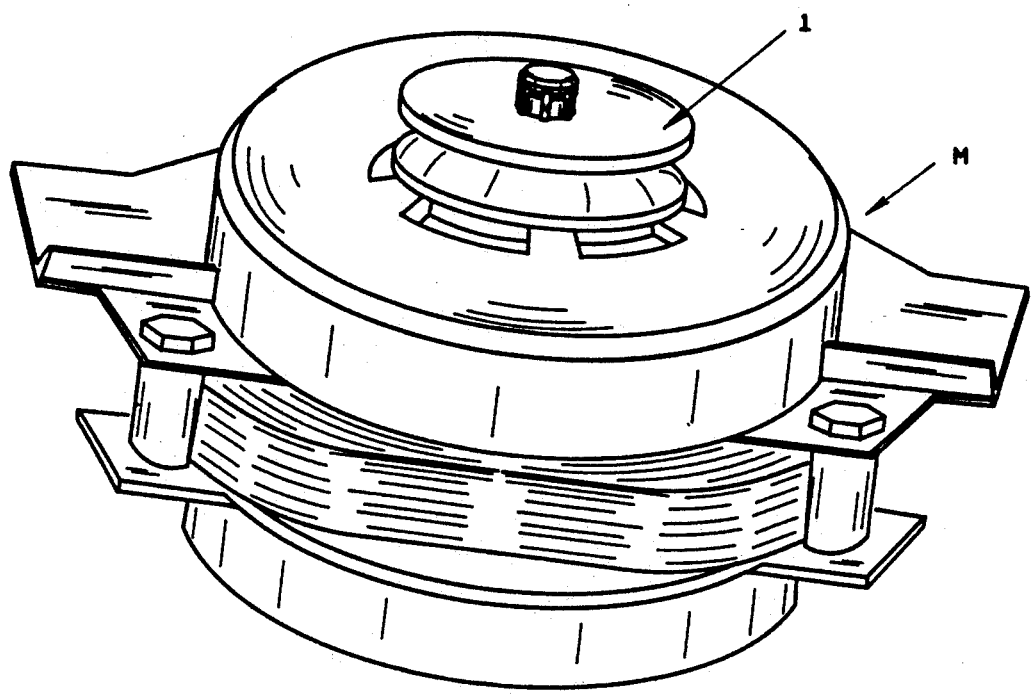
FIG. 1 is a perspective view of a motor showing one illustrative embodiment of pulley mechanism of the present invention.

Referring now to the drawings which are shown for the purpose of illustrating a preferred embodiment of the invention and not for the purpose of limiting the invention, FIG. 1 shows a perspective view of an electric motor M suitable for mounting in a home appliance, for example, a washing machine. Motor M has a pulley and shaft assembly employing the pulley retention mechanism of the present invention shown generally at 1.

Figure 2:
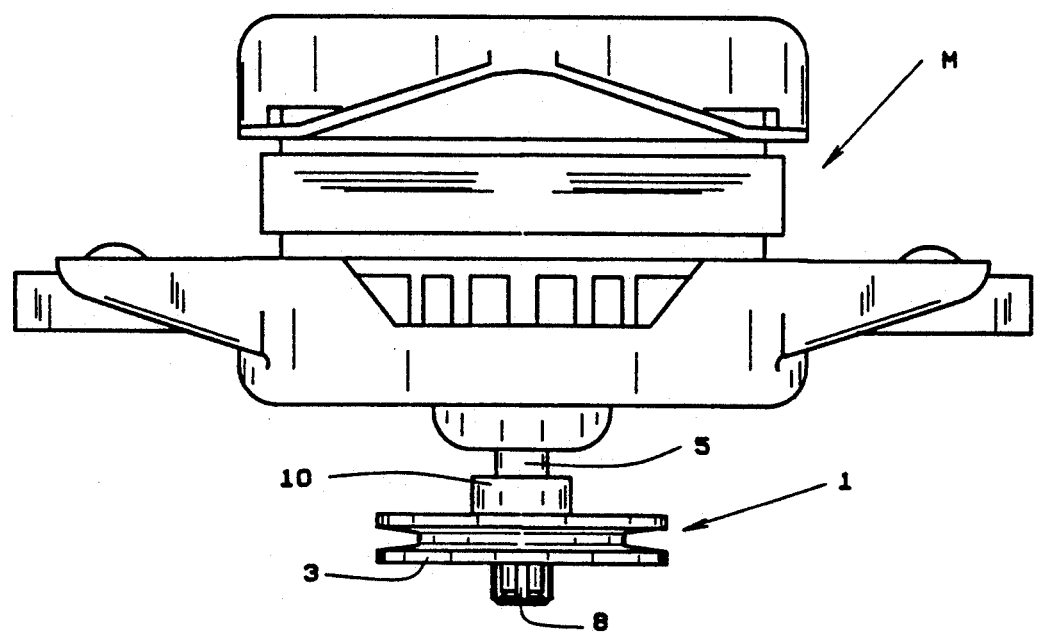
FIG. 2 is a side view of the motor shown in FIG. 1, illustrating mounting arrangement employed in use.
Figure 3:
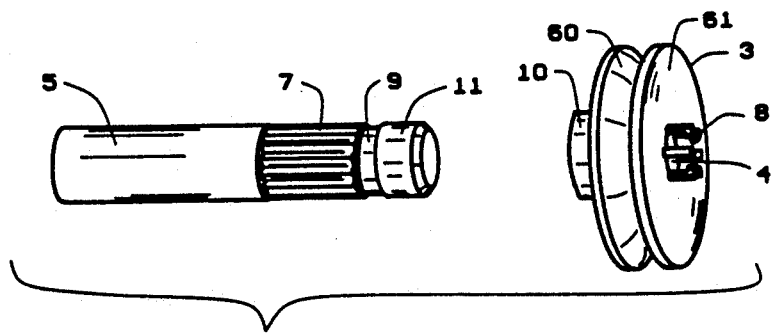
FIG. 3 is an exploded view of the shaft and pulley arrangement of the present invention.

FIG. 2 discloses another view of motor M as well as retention mechanism 1. FIG. 2 corresponds generally to an installed position of motor M. Mechanism 1 includes a pulley 3 and an elongate shaft 5, as best illustrated in FIG. 2. Shaft 5 has a plurality of splines 7, illustrated in FIG. 3, a circumferential groove 9, and beveled head 11 formed thereon and therein for purposes that will be explained hereinafter. Pulley 3 includes a first sheave 60 and a second sheave 61 integrally formed to one another and to a hub 10. The hub 10 has an axial opening 4 formed in it. A plurality of fingers 8 are formed around the opening 4 and extend axially outwardly therefrom on a first side of the pulley 3. A collar 10 is formed on a second side of the pulley 3, for purposes described in greater detail hereinafter.

As will be appreciated by those skilled in the art, the pulley 3 preferably is a one piece construction. The entire mechanism includes merely the pulley and the shaft 5.

Figure 4:
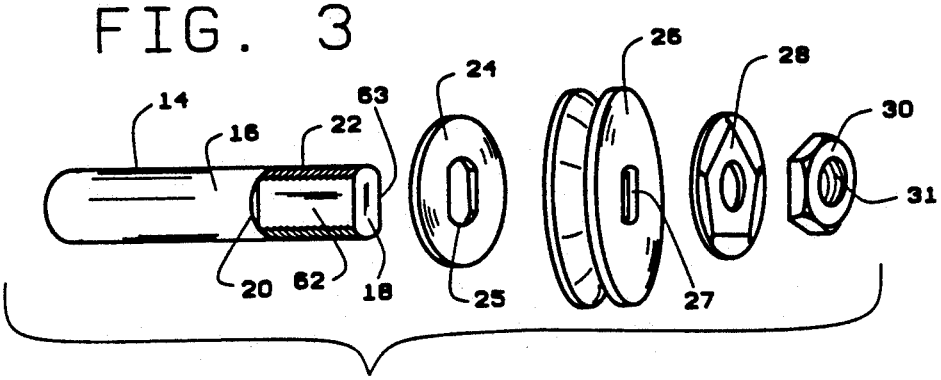
FIG. 4 is an exploded view, labeled as prior art, of a shaft and pulley assembly disclosed by our invention.

By contrast, FIG. 4 illustrates a shaft and pulley assembly known to the prior art. The shaft shown generally at 14, has a larger diameter body portion 16 and a formed portion 18. The portion 16 and 18 define a shoulder 20 at their junctions. Portion 18 has threads 22 formed thereon to accommodate a threaded nut 30. Portion 18 is specially formed so that it has rectangular walls 62 and 63 which function to engaged a pulley 24 as will be explained.

Washer 24 has an axial opening with rectangular walls 25 formed in it and is mated over shaft portion 18 until it abuts shoulder 20. In the prior art embodiment, washer 24 helps position the pulley 26. Pulley 26, has a central opening 27 formed in it, the shape of which corresponds to the shape of shaft portion 18. Opening 27 is sized to prevent movement of its pulley 26 on the shaft portion 18 until it abuts washer 24. The corresponding shapes of portion 18 and opening 27 allows the shaft to engage and drive the pulley 26. A retaining ring 28, with hole 29 formed in the center thereof, slides over portion 18 to function both as a washer and as a spacer to accommodate differences in tolerance in the motor shaft assembly. Finally, nut 30 having a threaded hole 31 therein is tightened on threads 32 to secure the pulley on the shaft. As can be seen from this description and the accompanying illustration, the prior art requires a plurality of parts and substantial assembly.

Figure 5:
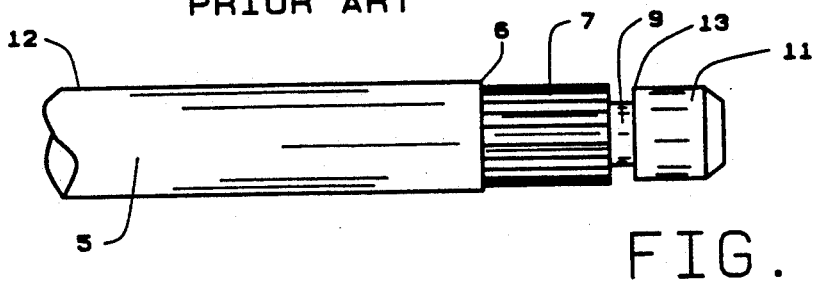
FIG. 5 is a side elevational view of the shaft component of the present invention.

Turning now to a detailed description of the shaft component of the mechanism of the present invention as best illustrated in FIG. 5, shaft 5 is a generally elongate motor shaft having an end 12 which has the rotor (not shown), of a dynamoelectric machine mounted to it in any conventional way. The shaft 5 rotates with the rotor in a convential manner. The working end of shaft 5 has a beveled head 11 which is designed to allow the pulley 3 to slip over head 11 easily. Shaft 5 can be made of any appropriate material, such as steel and can be in any appropriate length so as to be suited for the intended use in a motor.

A plurality of splines 7 are formed on surface of shaft 5. The dimensions of splines 7 as well as the location of splines 7 on shaft 5 are variable, depending upon the width and placement of the pulley to be mounted on shaft 5. A circumferential groove 9 is formed on shaft 5 between splines 7 and head 11. The overall dimensions of groove 9 can vary without departing from the scope of the invention. Groove 9 must be of proper width and depth so as to properly seat a plurality of the pawls 8 formed on the end of the fingers on the pulley as will be described in detail below. Groove 9 is formed with a sharp edge 13 at the shaft 5 surface. The edge 13 is intended to abut the pawls on the pulley component to prevent back out of the pulley as will be explained below.

Figure 6:
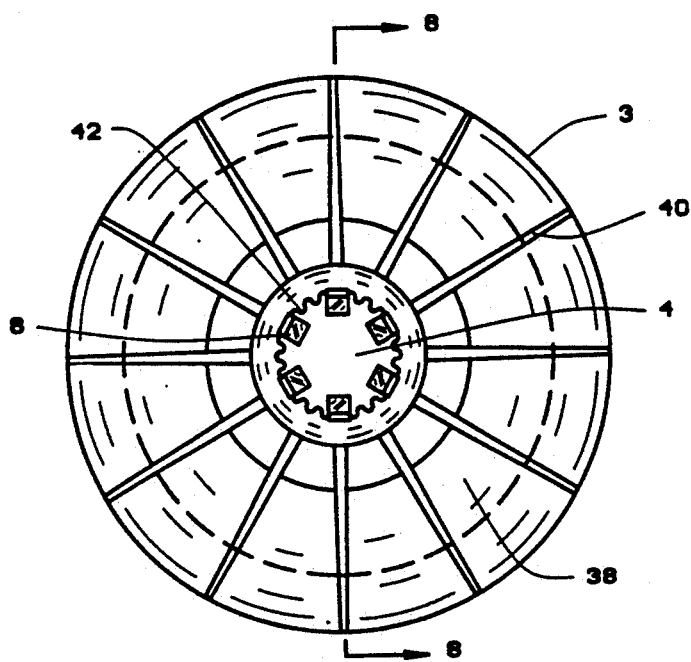
FIG. 6 is a top plan of the pulley component of the present invention.
Figure 7:
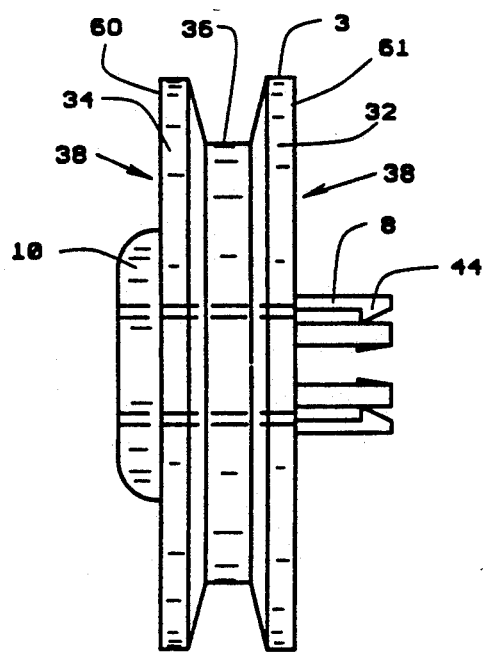
FIG. 7 is a side elevational view of the pulley component of the present invention.
Figure 8:
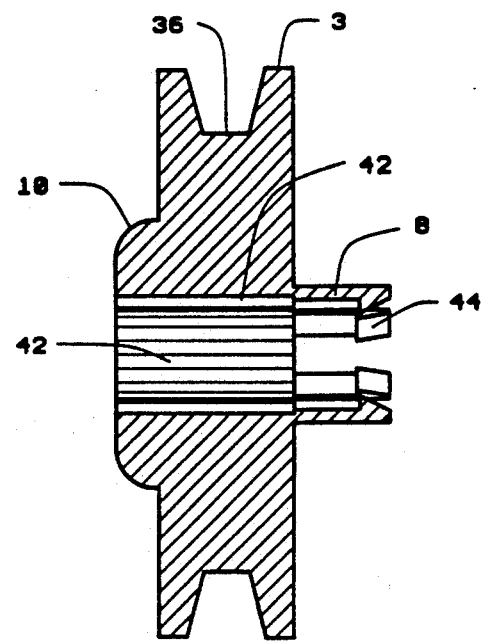
FIG. 8 is a cross-sectional view taken along lines 8—8 of FIG. 6.

Turning now to a more detailed description of the pulley component of the present invention, as illustrated in FIGS. 6-8, pulley 3 is defined by the sheaving parts 60 and 61 having outer sides 32 and 34 respective. The sheave parts 60 and 61 define a groove 36. Groove 36 is designed to accommodate a conventional drive belt (not shown). The drive belt may have a V or any other useful configuration. Pulley 3 is formed from any suitable material such as molded high impact plastic or resin. Sheave portions 60 and 61, in the embodiment shown, have a generally concave surface 38 which has radially extending members 40 formed therein, if desired. Pulley 3 has an axial opening 4 formed in it, defining a hub. The hub 10 has a collar 10, formed on the sheave 60 side of the pulley. The collar 1? functions both as a means to abut a shoulder 6 on shaft 5 when pulley 3 is mounted on shaft 5, and as a spacer to align pulley 3 properly on shaft 5 when assembled.

Opening 4 has a plurality of keyways 42 formed therein running along the axis of opening 4. Keyways 42 are of such width and depth so as to receive splines 7 of shaft 5. When assembled, splines 7 matingly fit in keyways 42 so as to allow shaft 7 to engage pulley 3 and drive it positively.

Pulley 3 has a plurality of fingers 8 extending axially outwardly from and about the perimeter of opening 4 on the sheave 62 side of pulley 3. Fingers 8 are flexible so that they move radially outwardly as the pulley 3 is placed over head 11 of shaft 9 but return to their original position when the pulley 3 is in place. Each Finger 8 has a pawl, such as at 44, formed on its axially outward end. In use, opening 4 of pulley 3 is positioned over head 11 on shaft 5. Pulley 3 is aligned so that splines 7 engage keyways 42 within opening 4. Pulley 3 is forced onto shaft 5 causing fingers 8 to spread radially outwardly allowing the shaft to pass through fingers 8 and pawls 44. When the pawls 44 align with groove 9 formed on shaft 5, pawls 44 spring back into groove 9, thereby locking pulley 3 in place. The dimensions of pulley 3 are such that collar 10 abuts shoulder 6 on shaft 5 to further stabilize the assembly. The square edge 13 of groove 9 abuts pawl 44 and the spring action of the fingers 8 further secure the pulley/shaft assembly and prevents back off of the pulley.

Figure 9:
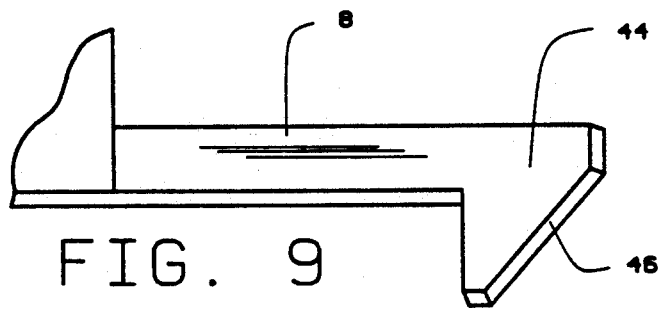
FIG. 9 is an enlarged side elevational view of the finger and pawl element formed of the pulley component of the present invention.
Figure 10:
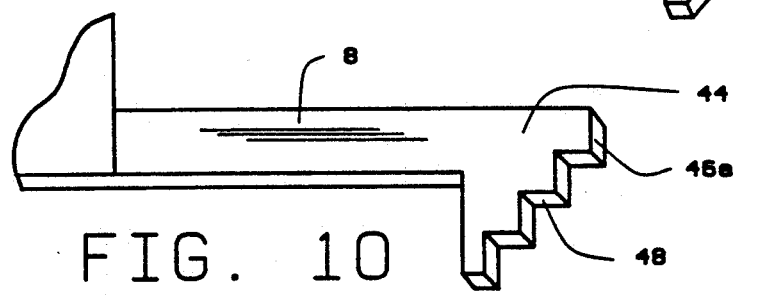
FIG. 10 is an enlarged side elevational view of one alternative embodiment of the finger and pawl element of the present invention.

Pawl 44 can assume various shapes or configurations, depending upon the intended use and depending upon application tolerances. For example, a pawl 44, best seen in FIG. 9, is of generally V-Shaped configuration. A front surface 46 is generally flat and is disposed to engage sharp edge 13 of groove 9. The abutment of edge 13 and surface 46 prevents back out of the pawl as previously described. FIG. 10 illustrates another embodiment of pawl 44. Surface 46a is formed with a stair-step configuration. That is a plurality of notches 48 are formed in surface 46a. The size and spacing of the notches 48 may vary depending upon the intended use of the assembly without departing from the scope of the invention. Any one of the notches as shown at 48 may engage edge 13 of groove 9 so as to secure the pawl in place depending upon the tolerance of shaft 5. In this manner, slight variations or tolerances in the drive position of the pulley 3 are accommodated.

Figure 11:
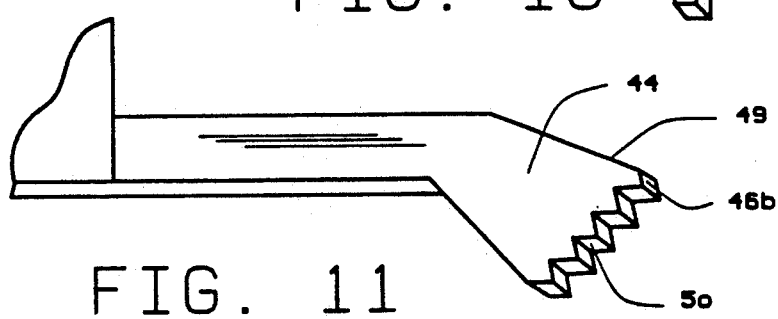
FIG. 11 is an enlarged side elevational view of another alternative embodiment of the finger and pawl element of the present invention.

FIG. 11 illustrates yet another embodiment of the pawl 44. A surface 49 is angled downward from the and front surface 46(b) is formed with a saw-tooth configuration. That is, the surface 46(b) has a plurality of teeth 50 formed in it. Again, this configuration permits the accommodation of variations in the axial portion of the pulley 3.

Those skilled in the art will realize that different configurations of pawls may be utilized on the same pulley. For example, every other pawl could be V-shaped and every other employ a stair-step configuration depending upon the intended use and tolerance of the shaft.

It should also be realized that the various changes in the configuration of the pawl can be made without departing from the scope of the invention. Those shown in the drawings and described above are illustrative only.

Numerous variations, within the scope of the appended claims will be apparent to those skilled in the art. While a particular plastic was described as preferred, other materials may be utilized, if desired. As indicated, the design of the pulley may vary. Likewise, the overall shape of the pulley 3 may vary in other embodiments of the invention. A single keyway, as opposed to the spline plurality, may be used to positively drive the pulley. These variations are merely illustrative.

Having thus described the invention, what is claimed and desired to be secured by Letters Patent is:

1. A mechanism for securing a pulley to a shaft comprising:
   a shaft, said shaft having a circumferential groove formed in an end thereof;
   a pulley, said pulley having an axial hole formed therein disposed to engage said shaft, said pulley having at least one finger formed around and extending axially outward from said hole, said finger disposed to engage said groove when said pulley is assembled on said shaft thereby positioning said pulley on said shaft.

2. The mechanism of claim 1 wherein said finger has a pawl formed on the end thereof, said pawl disposed to engage an edge of said groove in said shaft in the mounted position of said pulley.

3. The mechanism of claim 2 wherein said pulley has a plurality of fingers formed about said axial groove.

4. The mechanism of claim 3 wherein said pawls has a stepped face.

5. The mechanism of claim 3 wherein said pawls has a saw tooth face.

6. The mechanism of claim 3 wherein said shaft has at least one spline formed in it and the axial groove in said pulley has at least one keyway formed in it, said keyway being sized to receive said spline.

7. The mechanism of claim 6 wherein said shaft has a plurality of splines formed in it and said axial opening in said pulley has a corresponding number of keyways formed in it.

8. The invention of claim 7 wherein said groove on said shaft has sharp edges, said sharp edges disposed to dig into said pawl and resist back out.

9. In a motor having a shaft and pulley assembly, an improvement for securing the pulley on the shaft comprising:
   a shaft having a plurality of splines formed on one end;
   a groove formed on said shaft proximate said splines;
   a pulley having a hub formed therein, said hub having a plurality of splines formed therein, said splines disposed to matingly engage said splines on said shaft thereby preventing said shaft from rotating within said hub; and
   a plurality of fingers, said fingers formed around and extending outward from said hub, said fingers disposed to engage said groove formed on said shaft.

10. The invention of claim 9 wherein said fingers further comprises pawls formed therein, said pawls disposed to engaging said groove on said shaft.

11. In a motor having a pulley the improvement for attaching the pulley to a shaft, comprising:
   an elongate shaft, said shaft having a first end and a second end, said first end disposed to seat within said such motor so as to be rotatable therein, said second end having a circumferential groove formed therein; and
   a pulley, said pulley having an axial opening formed therein by a central hub said opening being sized to engage said shaft, said pulley having a plurality of flexible fingers, said fingers formed around and extending outward from said hub along the axial opening therein, each said finger having a pawl formed on the end thereof and disposed engage its groove on said shaft, thereby allowing said pulley on said shaft.

12. The invention of claim 11 wherein said shaft further comprising splines formed thereon proximate to said groove and said pulley further comprising keyways, said keyways formed within said hole, said keyways on said pulley disposed to matingly engage said keyways formed on said shaft thereby preventing rotation of said shaft within said pulley.

13. The invention of claim 11 wherein said pawl is of a V-shaped configuration.

14. The invention of claim 12 wherein said pawl is of a saw-tooth configuration.

15. The invention of claim 13 wherein said pawl is of a stair-step configuration.

16. In a motor having a shaft and a pulley the improvement for securing the pulley to the shaft comprising:
   a shaft, said shaft having a groove formed therein; and
   a pulley, said pulley having a hub formed therein for engaging said shaft, said pulley having a plurality of fingers formed thereon around said hub and extending outward, each said finger having a pawl formed thereon, said pawl disposed to engage said groove on said shaft when said pulley is installed on said shaft thereby securing said pulley on said shaft.

17. The invention of claim 16 wherein said hub has keyways formed therein.

18. The invention of claim 16 wherein said shaft has splines formed thereon proximate to said groove, said splines disposed to matingly fit into said keyways within said hub thereby preventing rotation of said shaft within said hub.

19. A mechanism for securing a pulley on a motor shaft comprising:
   an elongate shaft, said shaft having a first end and a second end, said first end disposed to seat within the motor so as to be rotatable therein, said second end having an annular groove formed thereon, said second end having a plurality of splines formed thereon proximate to said groove; and a pulley, said pulley having a hub formed therein to engage said shaft, said pulley having a plurality of flexible fingers formed around and extending outward from said hub, each said finger having a pawl formed on an end thereof and disposed to drop in said annular groove on said shaft thereby securing said pulley on said shaft, said hub also having a plurality of keyways formed therein, said keyways disposed to matingly engage said splines on the shaft.

* * * * *

UNITED STATES PATENT AND TRADEMARK OFFICE
CERTIFICATE OF CORRECTION

PATENT NO. : 5,275,577
DATED : January 4, 1994
INVENTOR(S) : Hildebrandt et al.

It is certified that error appears in the above-indentified patent and that said Letters Patent is hereby corrected as shown below:

```
Column 4, line 22, delete "1?" and insert therefor
---10---;
Column 5, line 4, after "downward" delete ---from the---;
```

Signed and Sealed this

Thirteenth Day of September, 1994

Attest:

BRUCE LEHMAN

*Attesting Officer*   *Commissioner of Patents and Trademarks*